(No Model.)

J. WHITE.
SEAT SPRING FOR BICYCLES.

No. 258,333.　　　　　　　　　Patented May 23, 1882.

Witnesses
Harold Serrell
Chas H. Smith

Inventor
Joseph White
per Lemuel W. Serrell
Atty

United States Patent Office.

JOSEPH WHITE, OF COVENTRY, COUNTY OF WARWICK, ENGLAND.

SEAT-SPRING FOR BICYCLES.

SPECIFICATION forming part of Letters Patent No. 258,333, dated May 23, 1882.

Application filed January 27, 1882. (No model.) Patented in England February 7, 1881, No. 512.

*To all whom it may concern:*

Be it known that I, JOSEPH WHITE, of Coventry, in the county of Warwick, England, have invented an Improvement in Seat-Springs for Bicycles, of which the following is a specification.

Springs for vehicles have been made with rubber cylinders within cases at the ends of such spring, and the seat-spring in a bicycle has been made with suspending-rods at the ends, around which sections of tubular rubber have been placed. India-rubber loops, by which the seat-spring is suspended, have been employed; but such rubber springs are either too rigid for the support of the seat, or liable to break when used as suspending-loops. Bicycle seat-springs must be sufficiently strong to support the rider, and at the same time the bearings for the ends of the springs should yield and prevent the disagreeable concussion resulting from riding over stone pavements.

My invention is intended for availing of the yielding character of rubber for the bearings at the ends of the seat-springs without any risk of injury to the rubber, and without any projecting rods or nuts to catch in the hand or clothing in mounting or dismounting.

Figure 1:
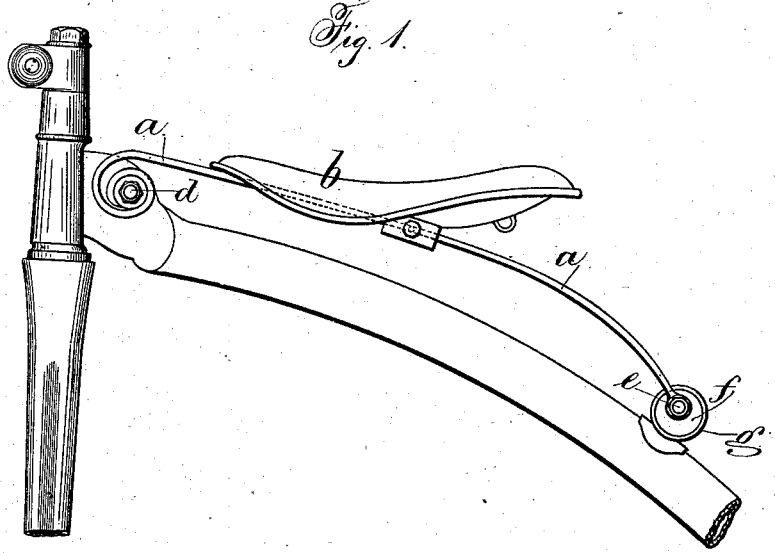
Figure 2:
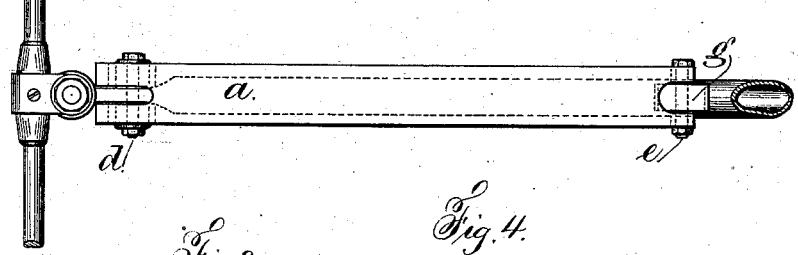
Figure 3:
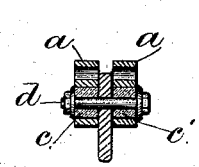
Figure 4:
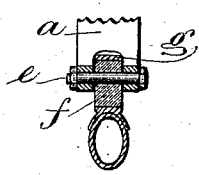

In the drawings, Figure 1 is a side view of the seat-spring and a portion of the backbone of the bicycle. Fig. 2 is a plan of the same. Fig. 3 is a cross-section of the spring front rubbers and support, and Fig. 4 is a cross-section of the spring back rubber and support.

The spring $a$ is adapted to receive the saddle $b$, the same being connected by clip-bolts in any usual manner. At the end next to the head of the machine the spring $a$ is forked and coiled up into cylindrical forms for the reception of the rubber cylinders $c\ c'$, and through these rubbers there are holes for the joint-pin $d$, that passes through the forward or solid end of the spine of the bicycle. At the other end the spring $a$ is forked and terminates with two eyes for the bolt $e$ to pass through. This bolt goes through the rubber cylinder $f$, that is within the cylinder $g$, that is bolted to the backbone, or otherwise attached. The weight upon the seat-spring is supported at the ends upon the rubber cylinders $c\ c'$ and $f$, and the bolts or joint-pins $d\ e$ act to displace the rubber and allow such pins to move slightly, and thereby the jar that would reach the rider is lessened by the yield of the rubber.

I claim as my invention—

The combination, with the seat, seat-spring, and backbone in a bicycle, of the rubber cylinders $c\ c'$ and $f$, the cylindrical cases for such springs, the joint pins or bolts passing through such rubber cylinders, and the jaw connected with the spine, substantially as set forth.

Signed by me this 15th day of November, A. D. 1881.

JOSEPH WHITE.

Witnesses:
GEO. T. PINCKNEY,
WILLIAM G. MOTT.